United States Patent
Tsutsumi et al.

(10) Patent No.: US 7,544,414 B2
(45) Date of Patent: Jun. 9, 2009

(54) ORIENTED SYNDIOTACTIC POLYSTYRENE-BASE FILM

(75) Inventors: Masayuki Tsutsumi, Ohtsu (JP); Hisato Kobayashi, Ohtsu (JP); Keizo Kawahara, Ohtsu (JP); Shigeto Yoshida, Ohtsu (JP); Shinsuke Yamaguchi, Ohtsu (JP); Kazutake Okamoto, Ohtsu (JP); Akira Takahashi, Ohtsu (JP); Eiji Kumagai, Ohtsu (JP); Akinobu Nagara, Ohtsu (JP); Yoshiko Akitomo, Ohtsu (JP); Kazumoto Imai, Inuyama (JP); Naonobu Oda, Inuyama (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 328 days.

(21) Appl. No.: 10/507,126

(22) PCT Filed: May 16, 2003

(86) PCT No.: PCT/JP03/06161

§ 371 (c)(1),
(2), (4) Date: Aug. 9, 2005

(87) PCT Pub. No.: WO03/097354

PCT Pub. Date: Nov. 27, 2003

(65) Prior Publication Data

US 2006/0035096 A1  Feb. 16, 2006

(30) Foreign Application Priority Data

May 17, 2002  (JP) ............................. 2002-143488

(51) Int. Cl.
*B32B 27/18* (2006.01)
*B32B 27/30* (2006.01)
*B32B 27/34* (2006.01)
*B32B 27/36* (2006.01)
*B32B 27/40* (2006.01)

(52) U.S. Cl. ............................. 428/343; 428/355 EN; 428/355 CN; 428/355 AC; 428/355 N; 428/424.2; 428/424.7; 428/424.8; 428/473.5; 428/476.3; 428/476.9; 428/480; 428/483; 428/484.1; 428/500; 428/515; 428/516; 428/520; 428/522; 428/523

(58) Field of Classification Search .................. None
See application file for complete search history.

(56) References Cited

U.S. PATENT DOCUMENTS

| 4,234,467 | A | * | 11/1980 | Ryrfors et al. ............... 524/833 |
| 4,336,166 | A | * | 6/1982 | Penczuk et al. ............... 524/53 |
| 4,347,344 | A | * | 8/1982 | Ong et al. ................. 526/347.1 |
| 4,359,547 | A | * | 11/1982 | Agarwal et al. ............. 524/504 |
| 4,503,184 | A | * | 3/1985 | Marongiu .................. 524/519 |
| 4,522,972 | A | * | 6/1985 | Mondt et al. ................. 524/548 |
| 4,923,921 | A | * | 5/1990 | Chevalier et al. ............ 524/555 |
| 4,939,190 | A | * | 7/1990 | Tomioka et al. .............. 523/206 |
| 4,968,373 | A | * | 11/1990 | Chevalier et al. ......... 156/331.8 |
| 5,037,700 | A | * | 8/1991 | Davis ......................... 428/414 |
| 5,188,930 | A | * | 2/1993 | Funaki et al. ................ 430/536 |
| 5,416,134 | A | * | 5/1995 | Skoglund ..................... 523/201 |
| 5,518,817 | A | * | 5/1996 | Yamasaki et al. ......... 428/411.1 |
| 5,707,719 | A | * | 1/1998 | Yoshinaga et al. ........... 428/220 |
| 5,777,028 | A | * | 7/1998 | Okada et al. .................. 525/86 |
| 5,798,172 | A | * | 8/1998 | Funaki et al. ................ 428/327 |
| 6,106,950 | A | * | 8/2000 | Searle et al. ............. 428/423.1 |
| 6,288,147 | B1 | * | 9/2001 | Vonken et al. ................. 524/44 |
| 6,432,475 | B1 | * | 8/2002 | Yamamoto et al. ....... 427/208.4 |
| 6,927,267 | B1 | * | 8/2005 | Varela de la Rosa et al. 526/287 |

FOREIGN PATENT DOCUMENTS

| EP | 0 444 206 A1 | | 9/1991 |
| EP | 0 504 522 A2 | | 9/1992 |
| EP | 0 772 082 A1 | | 5/1997 |
| JP | 07-223166 | | 3/1977 |
| JP | 53002536 | | 1/1978 |
| JP | 59-001583 | * | 1/1984 |
| JP | 3016728 | | 1/1991 |
| JP | 3124736 | | 5/1991 |
| JP | 03-131677 | * | 6/1991 |
| JP | 3281588 | | 12/1991 |
| JP | 04-040344 | | 8/1993 |
| JP | 07-001644 | * | 1/1995 |
| JP | 07-001644 A | | 1/1995 |
| JP | 7024911 | | 1/1995 |
| JP | 07-062304 | * | 3/1995 |
| JP | 7178878 | | 7/1995 |
| JP | 7189186 | | 7/1995 |
| JP | 8012837 | | 1/1996 |

(Continued)

OTHER PUBLICATIONS

Schimtz, Peter et al., "Films." Ullmann's Encyclopedia of Industrial Chemistry, 5th Ed., vol. A11 (1988), pp. 85-110.*

*Primary Examiner*—Vivian Chen
(74) *Attorney, Agent, or Firm*—Kenyon & Kenyon LLP

(57) ABSTRACT

An oriented syndiotactic polystyrene-based film composed of an oriented film made of a syndiotactic styrene polymer and an adhesiveness-improving layer formed from a specific water-dispersible resin on at least one surface of the oriented film, which is excellent in the tight adhesion between the oriented film and the adhesiveness-improving layer, the adhesion between the adhesiveness-improving layer and an ink layer or laminate layer applied thereon, economical efficiency, recyclability, and environmental compatibility in production. It is particularly preferable that the film be produced by applying the aqueous dispersion of the water-dispersible resin on unstretched or uniaxially stretched film to form the adhesiveness-improving layer, stretching the obtained laminate uni- or bi-axially at least one time, and then heat-treating the resulting laminate.

10 Claims, No Drawings

FOREIGN PATENT DOCUMENTS

| | | | |
|---|---|---|---|
| JP | 06-313321 | | 6/1996 |
| JP | 08-143727 | * | 6/1996 |
| JP | 8151492 | | 6/1996 |
| JP | 9068777 | | 3/1997 |
| JP | 10-079344 | | 5/1999 |
| JP | 08-143727 A | | 6/1999 |
| JP | 10-177281 | | 1/2000 |
| JP | 2000-000886 | | 1/2000 |
| JP | 2000-006330 | * | 1/2000 |
| JP | 2000-063773 | * | 2/2000 |
| JP | 2001081207 | | 3/2001 |
| JP | 11-274573 | | 4/2001 |
| JP | 2001310428 | | 11/2001 |
| JP | 2000-192224 | | 1/2002 |
| JP | 2004167848 | | 6/2004 |
| JP | 2004167849 | | 6/2004 |

* cited by examiner

ORIENTED SYNDIOTACTIC POLYSTYRENE-BASE FILM

TECHNICAL FIELD

The present invention relates to oriented syndiotactic polystyrene-based films, and more particularly, to oriented syndiotactic polystyrene-based film having excellent adhesiveness between said film and the adhesiveness-improving layer, as well as excellent adhesiveness in the case of the lamination of an ink layer or a laminated layer that are suited for packages, printed materials, and the like. Additionally, the present invention relates to oriented syndiotactic polystyrene-based films having excellent printability, adhesiveness and anti-static properties, as well as excellent travelling and anti-breakage properties upon high-speed printing that are suited as printed materials.

BACKGROUND ART

Oriented syndiotactic polystyrene-based films are excellent in thermal resistance, electric characteristics, transparency, ease of breakage, and the like, and are expected to be utilized for magnetic tapes, photographs/prepresses, condensers, packages, and various film applications.

Where an oriented film is used as a packaging material, optionally it is generally laminated on the oriented film at least one side with a printing layer, a gas barrier layer having an organic polymer coated and laminated thereon, and a gas barrier layer having a metal deposited thereon, and the like, and further laminated with an adhesive, on which a sealant layer is placed by a dry laminate technique or an extrusion laminate technique to form a laminate. Using said laminate, a bag is manufactured, filled with the contents, and heat-sealed at its opening to provide the sealed good products, medicines, sundry articles, and the like to consumers. Thus, the oriented film is generally subject to a physical treatment such as corona treatment, etc., and laminated with an adhesiveness-improving layer to provide an adequate adhesiveness to the printing layer, gas barrier layers, sealant layer, and the like in order to construct the above-described laminate.

Japanese Laid-open Patent Publication No. 5-338089 discloses an oriented syndiotactic polystyrene-based film made by subjecting the film surface to a corona treatment to increase the surface tension, and then coating it with an anchor coating agent, on which a sealant layer is placed. However, the corona discharge treatment suffers from such problems that the treated film is likely to be semi-permanently static-charged so that its operability is deteriorate, and its adhesiveness is not sufficient. Japanese Laid-open Patent Publication No. 2000-6330 discloses an oriented syndiotactic polystyrene-based film having a self-crosslinkable polyester-based graft copolymer adhesiveness-improving layer laminated thereon in order to enhance the adhesiveness between the gas barrier layers and the sealant layer. However, because the adhesiveness-improving layer is made of a crosslinkable polymer, the film has difficulties with respect to remelting and extruding for recycling.

On the other hand, Japanese Laid-open Patent Publications Nos. 3-109453, 3-109454, 8-39741, 8-48008, etc., disclose the lamination of a modifying layer on an oriented syndiotactic polystyrene-based film by a coating technique so as to improve its slipperiness and anti-abrasiveness, but the adhesiveness between the modifying later used and the film is not sufficient. Particularly, because the aforementioned techniques provides the film with poor waterproof laminate strength, when it is used as a package bag, the laminated portions in the package bag may be peeled off if the package bag becomes wet or under high humidity conditions, or the packaged contents may leak from the package bag or deteriorate.

As described above, the conventional oriented syndiotactic polystyrene-based films have not fully overcome such problems as the generation of scratches when used as printed materials, the lack of cohesion of the particles to the coated layer, the poor transfer or peeling of the ink, and the like. Particularly, when they are used for a sheet-fed offset printing technique, there remains a need for compatibility with wetting with water that is inherent in an offset printing technique, resistance to the strong friction in the paper feeding or carrying used for the sheet-feeding, a high degree of adhesiveness with the UV-curing-based inks, and the like. Therefore, the compatibility with wetting with water, slipperiness, anti-static properties, and adhesiveness to the ink are essential characteristics of the films.

In recent years, a sheet-fed UV offset color printer has been more popular as a procedure for printing a film, and the printing has been speed up (a feeding speed of around 0.5 seconds per paper). This is because of the improvement and advancement of the printers, and the printing films require adhesiveness to the ink, the compatibility with wetting with water, and anti-static properties, as well as a slipperiness which provides stable feeding with no multiple feeding at high speed paper feeding. No oriented syndiotactic polystyrene-based film that enables such high-speed printing has ever existed in the art.

Particularly, an oriented syndiotactic polystyrene-based film is excellent in easy-to-tear property, but hit poor impact resistance. For example, when it is used as a package bag, it suffers from such problems that the package bag breaks upon strong impact caused by the drop of the package bag, and that the film is likely to be ripped off at the production process or high speed printing, and the like. There is a need to improve these problems.

No technique is found for improving the above-described problems, but Japanese Laid-open Patent Publication No. 2001-310428 suggests a method of improving the toughness of an oriented syndiotactic polystyrene-based film by providing said film in multiple layers, and combining it with a thermoplastic resin or a thermoplastic elastomer. Said film has been developed for the purpose of providing a mold releasing film that is used in the manufacture of printed circuit boards, etc., However, the application of said technique to the aforementioned packaging field provides less effect on improving the impact resistance, which cannot satisfy the market demands.

DISCLOSURE OF THE INVENTION

It has been difficult to laminate a satisfactory adhesiveness-improving layer on an oriented syndiotactic polystyrene-based film. For example, when the conventional aqueous coating agent is used, said film does not have an sufficient adhesiveness with the adhesiveness-improving layer because the surface of said film has a low surface energy and high crystallinity. On the other hand, the use of a solvent-based coating agent is not desirable in view of sanitary and recycling reasons.

It is an objective of the present invention to provide an oriented syndiotactic polystyrene-based film having excellent adhesiveness between the film and the adhesiveness-improving layer, and excellent adhesiveness to ink layers and laminate layers if they are laminated. It is another objective to provide an oriented syndiotactic polystyrene-based film having excellent adhesiveness, printability as well as anti-static properties, and a slipperiness that enables stable feeding with no multiple feeding at high speed paper feeding. In addition to the aforementioned objectives, it is another objective to provide an oriented syndiotactic polystyrene-based film having excellent economical efficiency, recyclability, and environmental compatibility in production.

The present inventors have devoted considerable effort to provide an oriented syndiotactic polystyrene-based film having excellent adhesiveness between the adhesiveness-improving layer and the film, and found that the above-described objectives can be accomplished by laminating the adhesiveness-improving layer consisting of a specific resin on at least one side of said film.

Thus, the present invention is an oriented syndiotactic polystyrene-based film, comprising a laminated adhesiveness-improving layer on at least one side of said oriented syndiotactic polystyrene-based film, wherein said layer comprises one or more of the following resins (A)-(H):

(A) a water-dispersible polymer made by copolymerizing a monomer having an aromatic ring on its side chain with an acrylic monomer;

(B) a water-dispersible copolymerized polyester having a glass transition temperature of 30° C. or less, and/or a water-dispersible copolymerized polyester satisfying the following 1):

1) a ratio of B/(A+B) is 0.07 to 0.25, wherein A and B are the integrated values at chemical shifts of 1.0 ppm to 6.0 ppm and 7.0 ppm to 9.0 ppm, respectively, in $^1$H NMR;

(C) a water-soluble and/or a water-dispersible polyurethane resin;

(D) a water-soluble and/or a water-dispersible polyamide resin;

(E) a water-dispersible polyacrylonitrile resin;

(F) a water-dispersible ethylene-vinyl ester copolymer resin;

(G) a water-dispersible modified polyolefinic resin; and (H) a water-dispersible copolymer resin having an isobutylene unit, a maleic acid unit, and a n-butyl acrylate unit.

Also, the present invention is an oriented syndiotactic polystyrene-based film having excellent adhesiveness printability and anti-static properties, wherein said adhesiveness-improving layer contains a polymeric anti-static agent comprising a polystyrene sulfonic acid salt as a major component.

Further, the present invention is an oriented syndiotactic polystyrene-based film having excellent adhesiveness, printability and anti-static properties, as well as slipperiness that enables stable feeding at high speed paper feeding by laminating a slipperiness-improving layer comprising particles and/or waxes on the other side of said adhesiveness-improving layer.

Further, the present invention is an oriented syndiotactic polystyrene-based film encountering less film breakage problems in the manufacturing process and high-speed printing, in addition to the above-mentioned characteristics that, said adhesiveness-improving layer is laminated, wherein said oriented syndiotactic polystyrene-based film comprises 3 to 30 parts by weight of at least one thermoplastic elastomer selected from a styrene-butadiene-styrene block copolymer (SBS), a styrene-isoprene-styrene block copolymer (SIS), and/or a hydrogenated compound thereof (SEBS and SEPS) for 100 parts by weight of the syndiotactic polystyrene-based polymer.

The present invention in illustrated below in more detail.

(Styrene-based Polymer Having a Syndiotactic Structure)

The styrene-based polymer having a syndiotactic structure (hereinafter referred to as "syndiotactic polystyrene-based polymers") include poly(alkylstyrene) such as polystyrene, poly(p-, m- or o-methyletyrene), poly(2,4-, 2,5-, 3,4- or 3, 5-dimethylstyrene), poly(p-tertiary-butylstyrene), and the like; poly(halogenated styrenes) such as poly(p-, m- or o-chlorostyrene), poly(p-, m- or o-bromostyrene), poly(p-, m- or o-fluorostyrene), poly(o-methyl-p-fluorostyrene), and the like; poly(halogen-substituted alkylstyrenes) such as poly (p-, m- or o-chloromethylstyrene), and the like; poly(alkoxy-styrenes) such as poly(p-, m- or o-methoxystyrene), poly(p-, m- or o-ethoxystyrene), and the like; poly(carboxyalkylstyrenes) such as poly(p-, m- or o-carboxymethylstyrene), and the like; poly(alkylether styrenes) such as poly(p-vinylbenzylpropyl), and the like; poly(alkylsilylstyrenes) such as poly (p-trimethylsilylstyrene), and the like; and poly(vinylbenzyldimethoxyphosphides), and the like, in which as a syndiotactic structure, the phenyl or substituted phenyl group as a side chain has a tacticity of 85% or more diad (two units) and 50% or more pentad (five units), as determined by the nuclear magnetic resonance technique. Especially preferred are syndiotactic polystyrenes.

It is not necessary that the styrene-based polymer having a syndiotactic structure that can be used in the present invention be a single compound, but may be a mixture with a polystyrene-based polymer having an atactic or isotactic structure, or a copolymer or a mixture thereof. However, it should consist of at least 40% by weight of a styrene-based polymer having a syndiotactic structure.

Also, the syndiotactic polystyrene-based polymer that can be used in the present invention has a weight-average molecular weight of 10,000 or higher, more preferably 50,000 or higher. A biaxially oriented film having excellent strength and elongation characteristics and thermal resistance cannot be made from those having a weight-average molecular weight of 10,000 or less. The upper limit of the weight-average molecular weight is not specifically limited, but those having a weight-average molecular weight of greater than 15,000 may undesirably result in an increase in the extruder load, the generation of breakage due to the increase of the orientation tensile strength, and the like.

Various known additives such as lubricants, pigments, thermostabilizers, antioxidants, anti-static agents, impact improvers, and the like may be added to the syndiotactic polystyrene-based polymer that can be used in the present invention to the extent that they do not reduce the effects of the present invention.

The slipping agents include particles that are inactive to the syndiotactic polystyrene-based polymer, for example particles made from metal oxides such as silica, titanium dioxide, talc, kaolinite, and the like; metal salts such as calcium carbonate, calcium phosphate, barium sulfate, etc., and the like; and organic polymers, and the like. Either one of the above-described slipping agents may be used alone, or two or more of these may be used in combination.

In the preferred embodiment of the present invention, it is preferred to use a composition comprising as a major component 3 to 30 parts by weight of at least one thermoplastic elastomer selected from a styrene-butadiene-styrene block copolymer (SBS), a styrene-isoprene-styrene block copolymer (SIS), and a hydrogenated compound thereof (SEBS and SEPS) for 100 parts by weight of the syndiotactic polystyrene-based polymer, in order to prevent the breakage of the package bag when it is used as a package bag, or to prevent the breakage of the film during manufacturing and processing steps.

The thermoplastic elastomers that can be used in the present invention include any such elastomers with no limit of their composition and molecular weight, so long as they have the above-mentioned structure. Either one of the thermoplastic elastomers may be used alone, or two or more of these may be used in combination. However, when the blending amount of said thermoplastic elastomer is less than 3 parts by weight, an impact resistance improving effect is undesirably reduced. Conversely, when it exceeds 30 parts by weight, the resulting film has undesirably reduced thermal resistance and transparency.

(Manufacture of Oriented Syndiotactic Polystyrene-based Films)

The oriented syndiotactic polystyrene-based film of the present invention can be manufactured according to a known procedure. For example, a sequential biaxial orientation technique is applicable in which a non-oriented film that is obtained by fusing and extruding a syndiotactic polystyrene-based polymer from a dies in the form of a film and cooling and solidifying it is sequentially subjected to the longitudinal and transverse orientations. In addition, the sequential orientation techniques such as the transverse-longitudinal sequential biaxial orientation technique, longitudinal-transverse-longitudinal sequential orientation technique, longitudinal-longitudinal-transverse sequential orientation technique; and the concurrent biaxial orientation technique, in which the longitudinal and transverse orientations concurrently take place, and the like are also available. Any orientation technique can be selected depending upon various characteristics such as the required strength and dimensional stability, and the like. It may be a uniaxially oriented film made by the longitudinal or transverse uniaxial orientation technique. The orientation devices that can be used include roll stretching machine, tenter stretching machine, inflation machine, and the like. Also, the film after being oriented is preferably subjected to a thermal treatment such as the thermal fixation treatment, longitudinal relaxation treatment, transverse relaxation treatment, and the like in order to improve the thermal dimensional stability, adhesiveness, and the like.

Any process is used for the formation of the adhesiveness-improving layer and/or the slipperiness-improving layer of the present invention, onto an oriented syndiotactic polystyrene-based film, but comprises applying an aqueous coating solution to the non-oriented film or uniaxially oriented film, drying the coated film, then stretching it more than once in the uniaxial or biaxial direction, and thereafter subjecting the resultant film to a thermal treatment (such as the in-line coating technique). Also, the oriented and thermally treated film may be applied with the aqueous coating solution and dried by in-line or off-line. The in-line coating technique is preferred because the film is manufactured at a low price and the adhesiveness between the film and the adhesiveness-improving layer is improved.

The coating techniques for forming the adhesiveness-improving layer and the slipperiness-improving layer according to the present invention include commonly used techniques such as gravure coating, kiss coating, dipping, spray coating, curtain coating, air knife coating, blade coating, reverse roll coating, die coating, and like.

The thickness of the adhesiveness-improving layer and slipperiness-improving layer according to the present invention is not specifically limited, but the post-drying thickness is preferably 0.05 to 1.0 µm, more preferably 0.07 to 0.5 µm, especially preferably 0.09 to 0.3 µm.

Any known additives such as surfactants, antioxidants, thermal resistance stabilizers, weather resistance stabilizers, UV absorbents, organic lubricants, and the like may be contained in the coating solution/dispersion used for the formation of the adhesiveness-improving layer and slipperiness-improving layer according to the present invention, to the extent that they do not reduce the effects of the present invention.

(Resins Constituting the Adhesiveness-improving Layer)

The present invention is a readily adhesive and readily printable oriented syndiotactic polystyrene-based film, comprising a laminated adhesiveness/printability-modifying layer on at least one side of said film, wherein said layer comprises one or more of the following resins (A)-(E). Especially preferred are (A), (B), and (C) because they are excellent in all of the adhesiveness, printability, waterproof laminate strength, anti-static properties, and recyclability. Among others, (A) is especially preferred.

In a preferred embodiment, the oriented syndiotactic polystyrene-based film according to the present invention has a laminate strength and/or a waterproof laminate strength of 50 gf/15 mm or higher, more preferably 70 gf/15 mm or higher, and especially preferably 90 gf/15 mm or higher. If the laminate strength is less than 50 gf/15 mm, when it is used as a package bag, the laminate portion of the package bag may be peeled off, undesirably causing the leakage of the packaged contents or its deterioration.

The resins (A)-(E) that can be used in the present invention is illustrated in detail.

(A) Water-dispersible Polymer Made by Copolymerizing a Monomer Having an Aromatic Ring on its Side Chain with an Acrylic Monomer A water-dispersible polymer made by copolymerizing a monomer having an aromatic ring on its side chain with an acrylic monomer refers to a polymer which is soluble or dispersible in a coating solution comprising water, or a major amount of water, and an aqueous alkaline solution, an aqueous acidic solution, an organic solvent, or a surfactant, and the like; and the water-dispersibility is developed by the introduction of a hydrophilic group on the side chain. The hydrophilic groups include —$CO_2M$ group, —$SO_3M$ group (wherein M is hydrogen atom, Group I, II and III elements of the Periodic Table, amines or ammonium), —$NH_2$, —OH, and the like.

The monomers having an aromatic ring in the present invention include styrene, p-methylstyrene, m-methylstyrene, o-methylstyrene, 2,4-dimethylstyrene, 2,5-dimethylstyrene, 3, 4-dimethylstyrene, p-tertiary-butylstyrene, and the like.

Examples of the acrylic monomers in the present invention include functional group-containing monomers such as acrylamide, acrylic acid, methacrylic acid, methyl acrylate, ethyl acrylate, butyl acrylate, methyl methacrylate, ethyl methacrylate, butyl methacrylate, and 2-hydroxylethyl methacrylate, glycidyl methacrylate, dimethylamino methacrylate, and the like. The monomer may be used alone, or two or more of these may be used in combination. Particularly, in a preferred embodiment, various monomer comprising said functional group-containing monomers are combined and used for the purpose of improving the dispersibility in water, and imparting an effect on the adhesiveness with the adhesive for the laminate.

Also, in a preferred embodiment, the resin (A) consists of a water dispersible copolymerized polymer comprising as major components a component of said monomer having an aromatic ring, and a component of said acrylic monomer, wherein the weight ratio of the monomer having an aromatic ring in said polymer is 0.15 to 0.85, preferably 0.2 to 0.8. The above-described range provides a significant improvement in the adhesiveness between the oriented syndiotactic polystyrene-based film and the adhesiveness-improving layer, and its waterproof laminate strength.

(B) Water-dispersible Copolymerized Polyester

The water-dispersible copolymerized polyester according to the present invention refers to a polyester which is soluble or dispersible in an aqueous coating solution in a water percentage of 20% by weight or more. The major components in the aqueous coating solution include, for example, aqueous alkaline solutions, aqueous acidic solutions, organic solvents, and water containing a surfactant, and the like. The water dispersibility of the straight-chain polyester is developed by for example the introduction of a hydrophilic group into the major chain of the polyester. The hydrophilic groups include —$NH_2$ group, —OH group, —$CO_2M$ group, —$SO_3M$ group (wherein M is hydrogen atom, or a cation such as Group I, II and III elements of the Periodic Table, ammonium, etc.), and the like.

It is necessary that the glass transition temperature of one of the water-dispersible copolymerized polyesters be 30° C. or lower, more preferably 10° C. or lower. The use of a water-dispersible copolymerized polyester having a glass transition temperature of 30° C. or lower will improve significantly the adhesiveness between the oriented syndiotactic polystyrene-based film and the adhesiveness-improving layer.

The other water-dispersible copolymerized polyester that can be used in the present invention is comprised of a water-dispersible copolymerized polyester that satisfies the following condition (1):

(1) a ratio of B/(A+B) is 0.07 to 0.25, wherein A and B are the integrated values at chemical shifts of 1.0 ppm to 6.0 ppm and 7.0 ppm to 9.0 ppm, respectively, in $^1H$ NMR. When the ratio of B/(A+B) is 0.07 to 0.25, the adhesiveness between the oriented syndiotactic polystyrene-based film and the adhesiveness-improving layer will be significantly improved. The requirement that the ratio of B/(A+B) is 0.07 or more is likely to be due to the effect that a peculiar hydrophobic surface generated from the high regularity of the oriented syndiotactic polystyrene-based film has affinity with the methylene chain of the water-dispersible polymer chain.

On the other hand, the requirement that the ratio of B/(A+B) is 0.25 or less is likely to be due to the overly reduced cohesive force of the adhesiveness-improving layer if the ratio is above 0.25.

(C) Water-soluble and/or Water-dispersible Polyurethane Resins

The water-soluble and/or a water-dispersible polyurethane resin according to the present invention refers to a polyurethane-based resin which is soluble or dispersible in an aqueous coating solution comprising water, or a major amount of water, and an aqueous alkaline solution, an aqueous acidic solution, an organic solvent, or a surfactant, and the like, and the water-dispersibility is developed by the introduction of a hydrophilic group on the main chain and/or side chain. The hydrophilic groups include —$CO_2M$ group, —$SO_3M$ group (wherein M is hydrogen atom, Group I, II and III elements of the Periodic Table, or a cation such as ammonium), —$NH_2$, —OH, a basic nitrogen group, a polyalkylene glycol group, and the like. For example, they are manufactured by copolymerizing with a diamine or diol containing a hydrophilic group such as carboxylic acid, sulfonic acid, phosphonic acid, and polyalkylene glycol, and the like. Especially preferred are water-dispersible polyurethane-based resin due to their excellent waterproof laminate strength.

(D) Water-soluble and/or Water-dispersible Polyamide Resins

The water-soluble and/or a water-dispersible polyamide resin refers to a polyamide-based resin which is soluble or dispersible in a coating solution comprising water, or a major amount of water, and an aqueous alkaline solution, an aqueous acidic solution, an organic solvent, or a surfactant. Especially preferred are water-dispersible polyamide-based resins due to their excellent waterproof laminate strength. For example, the water-dispersibility is developed by the introduction of a hydrophilic group on the main chain and/or side chain of polyamide. The hydrophilic groups include —$CO_2M$ group, —$SO_3M$ group (wherein M is hydrogen atom, Group I, II and III elements of the Periodic Table, or a cation such as ammonium), —$NH_2$, —OH, a basic nitrogen group, a polyalkylene glycol group, and the like. For example, they are made by copolymerizing monomers containing hydrophilic group comprising a diamine or dicarboxylic acid containing a basic nitrogen or a diamine or dicarboxylic acid containing a polyalkylene glycol chain to provide the hydrophilicity to the polyamide-based resin, and by introducing a side chain such as a carboxylic acid group, a sulfonic acid group, a phosphonic acid group, and an alkylene glycol chain, and the like to provide the hydrophilicity to the polyamide-based resin, or combining both procedures. The copolymerized polyamide-based resins made by copolymerizing the diamine or dicarboxylic acid containing a basic nitrogen include, but not limited to, those disclosed in, for example Japanese Laid-open Patent Publication No. 55-783. The copolymerized polyamide-based resins made by copolymerizing monomers having a hydrophilic group such as a diamine or dicarboxylic acid containing a polyalkylene glycol chain include, but not limited to, those disclosed in, for example Japanese Laid-open Patent Publication No. 11-166121.

(E) Water-dispersible Polyacrylonitrile Resins

The water-dispersible polyacrylonitrile resin refers to a polyacrylonitrile-based resin which is dispersible in a coating solution comprising water, or a major amount of water, and an aqueous alkaline solution, an aqueous acidic solution, an organic solvent, or a surfactant, and the like and for example the water-dispersibility is developed by the introduction of a hydrophilic group on the main chain and/or side chain. The hydrophilic groups include —$CO_2M$ group, —$SO_3M$ group (wherein M is hydrogen atom, Group I, II and III elements of the Periodic Table, or a cation such as ammonium), —$NH_2$, —OH, a basic nitrogen group, a polyalkylene glycol group, and the like.

The polyacrylonitrile-based resins that can be used in the present invention include any such resins having water dispersibility, but those containing a polar group other than a nitrile group are preferred. The polar groups include, but are not limited to, a carboxyl group, a sulfonic acid group, a phosphoric acid group, a carbonyl group, a primary amino group, a secondary amino group, a tertiary amino group, a quaternary amino group, an ammonium group, a phosphoric acid ester group, a hydroxyl group, a mercapto group, an ether group, an ester group, a sulfonyl group, and a sulfuric acid ester group, and the like. Especially preferred are those containing an ionic group such as a carboxyl group, a sulfonic acid group, a phosphoric acid group, a primary amino group, a secondary amino group, a tertiary amino group, a quaternary amino group, and an ammonium group, and the like. Also, less than 50% by weight of an ethylenically unsaturated compound may be copolymerized therewith.

(F) Water-dispersible Ethylene-vinyl Ester Copolymer Resins

The water-dispersible ethylene-vinyl ester copolymer resin is a copolymer containing an ethylene unit and a vinyl ester unit. The vinyl ester units include, for example, alkyl vinyl esters such as vinyl acetate, vinyl butyrate, vinyl isononanic acid, vinyl versatate, and the like. Two or more vinyl ester units may be used as the vinyl ester unit. Among these vinyl ester units, vinyl acetate is preferred. Less than 10 mole % of a polar monomer such as an acrylic acid derivative, vinyl chloride, and the like may be copolymerized therewith.

Any process for the manufacture of the above-mentioned water dispersion of the vinyl ester copolymerized resin may be used with an emulsion polymerization technique being preferred. For example, preferably, these include, but are not limited to, processes disclosed in Japanese Laid-open Patent Publications Nos. 11-71434 and 2002-348339, etc.

(G) Water-dispersible Modified Polyolefinic Resins

The water-dispersible modified polyolefinic resin refers to any polyolefinic resin having water dispersibility. These include, but are not limited to, polyolefinic resins having a hydrophilic group (such as carboxylic acid, sulfonic acid, phosphonic acid, and polyalkylene glycol, etc.) introduced into the polyolefin backbone to provide water dispersibility. The polyolefin backbones of said polyolefinic resins include polyolefinic resins consisting of homopolymors of olefin monomers such as ethylene propylene, butene, and the like, or copolymers of these monomers; ionomer resins consisting of copolymers of ethylene with a polar monomer such as acrylic acid; and the like.

(H) Copolymer Resins Having an Isobutylene Unit, a Maleic Acid Unit, and a n-butyl Acrylate Unit The copolymer resin having an isobutylene unit, a maleic acid unit, and a n-butyl acrylate unit refers to such a terpolymer resin as described above which is soluble in an alkaline water. Its composition and process include but is not limited to, those disclosed in Japanese Laid-open Patent Publication No. 5-112615 is preferred.

The terpolymer becomes soluble in an aqueous alkaline solution by hydrolyzing its acid anhydride portion with alkali such as aqueous ammonia or an aqueous sodium hydroxide solution, and the like.

(Aqueous Coating Solutions)

According to the present invention, an aqueous coating solution comprising the water soluble and/or dispersible resins (A)-(H) are used for the formation of the adhesiveness-improving layer.

In order to disperse or dissolve the resins (A)-(H) in water, a solvent may be mixed with the aqueous coating solution to make the coating solution readily wettable on the film. The solvents to be used include highly polar solvents, i.e., solvents that swell, disperse, or dissolve the water-dispersible polymer component. Specific examples of these solvents include alcohol-, ester-, ketone-, and amide-based solvents having a carbon number of 1 to 5. The alcohols include methyl alcohol, ethyl alcohol, propyl alcohol, isopropyl alcohol, butyl alcohol, isobutyl alcohol, t-butyl alcohol, pentyl alcohol, and neopentyl alcohol, and the like. Specific examples of the ester-, ketone- and amide-based solvents include ethyl acetate, butyl acetate, isobutyl acetate, methyl cellosolve, ethyl cellosolve, and the like. These solvents may be used alone, or as a mixed solvent in combination. Also, in a preferred embodiment, an acid or alkali component may be added to control the pH of the aqueous solvent so as to improve its water solubility or water dispersibility. Further, a surfactant such as sodium alkylbenzene sulfonates, sodium alkylnaphthalene sulfonates, sodium alkylsulfonates, sodium alkylethersulfonates, and the like; and a fatty acid salt, lithium hydroxide, potassium hydroxide, sodium hydroxide, sodium borate, sodium carbonate, sodium acetate, magnesium acetate, and the like may be contained in the water.

(Polymeric Anti-static Agents Blended in the Adhesiveness-improving Layer)

Optionally, a styrene-based resin containing a sulfonate group component within the molecule, for example, a polystyrene sulfonate may be blended as a polymeric anti-static agent in the adhesiveness-improving layer to provide an anti-static property. The polymeric anti-static agent is characterized as having a high hydrophilicity of the sulfonic acid component. The styrene-based resins containing a sulfonate group component within the molecule include homopolymors such as the sodium, potassium, lithium, ammonium, and phosphonium polystyrene sulfonates, and the like; and copolymers of an acrylic monomer such as acrylate esters, methacrylate esters, etc., with a sulfonic acid monomer, and the like.

The molecular weight of the polystyrene sulfonate that can be used in the present invention is 1,000 to 150,000, preferably, 10,000 to 70,000. If the molecular weight is less than 1,000, the coated film will not have sufficient water resistance, and if it is more than 150,000, it will be difficult to homogeneously mix it with the above-described water-dispersible copolymerized polymer.

The content of said polymeric anti-static agent in the adhesiveness-improving layer of the present invention is 5 to 60% by weight. If the content of the polymeric anti-static agent is less than 5% by weight, it will not generate the anti-static effect, and if it exceeds 60% by weight, the adhesiveness of the film to the base material, the film strength and the solvent resistance will be insufficient, which leads to, for example the deterioration of the water wettability of the film during offset printing, causing the generation of problems such as thin spots, and bleeding.

In the preferred embodiment of the present invention, the adhesiveness-improving layer has a surface resistance value at 25° C. and 60 RH % of $1 \times 10^{12}$ $\Omega/\square$ or less. If the surface resistance value exceeds $1 \times 10^{12}$ $\Omega/\square$, the oriented syndiotactic polystyrene-based film of the present invention is likely to be charged which may adversely affect the workability and operability of the film during processing steps such as printing, or lamination, etc. Also, in a preferred embodiment, the contact angle of the adhesiveness-improving layer with water is 40 degrees or more, preferably 60 degrees or more with view of its water resistance. If its contact angle in water is less than 40 degrees, the water wettability of the film during offset printing becomes poor, which may cause the generation of problems such as thin spots, and bleeding.

(Smoothness-improving Layers)

When the film is used as a printed film having an excellent high-speed paper feeding property, a slipperiness-improving layer containing particles and/or waxes may preferably be laminated on the other side of the above-mentioned adhesiveness-improving layer. In a preferred embodiment, said slipperiness-improving layer is made from a composition comprising (a) a copolymerized polyester resin, (b) a compound having a sulfonate group, (c) particles having an average particle size of 1.0 to 5.0 μm, and (4) a polymeric wax.

The above-mentioned copolymerized polyester resin (a) is a water-soluble or water-dispersible copolymerized polyester resin. It is a copolymerized polyester polycondensate having at least one dicarboxylic acid component and at least one diol component, and its ester-forming component as units, and may be a commonly used copolymerized polyester resin, but it may also be a copolymerized polyester resin having water dispersibility imparted by the graft polymerization of a hydrophilic component onto an essentially water-insoluble polyester resin with a basic backbone that is neither water-dispersible nor water-soluble.

The dicarboxylic acid component which is the unit of the copolymerized polyester resin (a) includes, for example, (1) aromatic dicarboxylic acids such as terephthalic acid, isophthalic acid, 2,6-nathlalene dicarboxylic acid, 4,4'-biphenylene dicarboxylic acid, 5-sodium sulfo-isophthalic acid, and the like; (2) aliphatic dicarboxylic acids such as succinic acid, adipic acid, azelaic acid, sebacic acid, and the like; (3) alicyclic dicarboxylic acids such as 1,4-cyclohexane dicarboxylic acid, 1,2-cyclohexane dicarboxylic acid, and the like; and (4) unsaturated dicarboxylic acids such as maleic acid, fumaric acid, tetrahydrophthalic acid, and the like. Among other things, terephthalic acid and isophthalic acid are preferred, but a small amount of other dicarboxylic acids may be added.

The diol component which is the other component of the copolymerized polyester resin (a) includes, for example, (1) aliphatic diols such as ethylene glycol, diethylene glycol, propylene glycol, 1,3-propane diol, 1,4-butane diol, neopentyl glycol, 1,6-hexane diol, polyethylene glycol, and the like; (2) alicyclic diole such as 1,4-cyclohexane dimethal, and the like; (3) aromatic diols such as 4,4'-bis(hydroxyethyl) biaphenol A, and the like; and bis(polyoxyethylene glycol) bisphenol ether. Among other things, ethylene glycol, and diethylene glycol are most preferable, but a small amount of other diol components may be used.

In addition to the above-mentioned dicarboxylic acid component, 5-sodium sulfo-isophthalic acid may preferably be used in the range of 1- to 10 mole % so as to impart water dispersibility to the copolymerized polyester resin (a). Further, sulfo-terephthalic acid, 4-sulfo-isophthalic acid, 4-sulfo-naphthalene-2,6-dicarboxylic acid, and 5- (4-sulfophenoxy) isophthalic acid, and the like may be used.

The content of the copolymerized polyester resin (a) in the slipperiness-improving layer is preferably in the range of 30 to 95% by weight. If it is less than 30% by weight, the resulting film does not have satisfactory strength, and is likely to separate in the presence of an external force. Further, the particles separate from the layers of the film. Also, if it exceeds 95% by weight, the film strength is improved, but is less likely to exhibit the intended performances such as anti-static properties, slipperiness, and the like. The preferred content is 50 to 90% by weight.

The above-described compound having a sulfonate group (b) is a compound used for the purpose of providing the anti-static property, and includes, for example, polymeric anti-static agents which are comprised of one or more polymers of unsaturated monomers having a sulfonate group (for example, sodium vinyl sulfonate, sodium methacryl sulfonate, sodium styrene sulfonate, ammonium vinyl sulfonate, potassium methacryl sulfonate, and lithium styrene sulfonate, and the like); and monomeric anti-static agents represented by R—SO$_3$X (wherein R is an alkyl group, an aryl group, or an aromatic having an alkyl group, and X is a metal ion (for example, a cation such as Li, Na, K, etc.), an ammonium ion, an amine ion or a phosphate ester ion), and dimers thereof, but is not limited to those compounds, so long as it has a sulfonate group with excellent thermal resistance, and functions to generate anti-static properties.

The polymeric anti-static agents include, for example, polymer compounds which are similar to those comprising a polystyrene sulfonate salt as a major component that are blended in the adhesiveness-improving layer.

The monomeric anti-static agents include, for example, alkyl sulfonates such as sodium pentane sulfonate, sodium octane sulfonate, lithium octane sulfonate, potassium octane sulfonate, and sodium tetradecyl sulfonate; and aryl sulfonates such as sodium benzyl sulfonate, sodium tolyl sulfonate, sodium naphtyl sulfonate; and aromatic sulfonates having an alkyl group, for example, metal (e.g., Li, K, and Na) alkylbenzene sulfonates having a carbon number of 8 to 20, such as sodium dodecyl benzene sulfonate, sodium alkyl-naphthalene sulfonates having a carbon number of 8 to 20, and sodium alkyl-phenylether disulfonates having a carbon number of 8 to 20.

The content of the compound having a sulfonate group (b) that can used in the present invention in the slipperiness-improving layer is preferably 5 to 50% by weight, more preferably 10 to 30% by weight for the polymeric anti-static agent, and preferably 0.5 to 15% by weight, more preferably 2 to 10% by weight for the monomeric anti-static agent. The above-described monomeric and polymeric compounds may be mixed and used. If the content of the compound having a sulfonate group in the slipperiness-improving layer is too little, the surface specific resistance value of the slipperiness-improving layer becomes greater. The surface specific resistance value of the slipperiness-improving layer in preferably $1\times10^{12}$ Ω/□ or less at 25° C. and 50 RH %, and if it exceeds $1\times10^{12}$ Ω/□, the paper feeding property at high-speed printer will deteriorate. If the content of the compound having a sulfonate group (b) is too high, contamination on the printing surface may occur due to the set off and separation of particle.

The particles having an average particle size of 1.0 to 5.0 μm (c) that can be used in the present invention include commercially available inorganic and/or organic particles. The average particle size is more preferably in the range of 1 to 3 μm. For example, the inorganic particles include, but are not limited to, silica, calcium carbonate, alumina, and the like. For example, the organic particles include, but are not limited to, olefinic resins, acrylic resins, styrene-based resins, urethane-based resins, amide-based resins, and ester-based resins, and the like. Particles having a more uniform particle size and higher thermal resistance are preferable, such as crosslinked polystyrene-based spherical particles, benzoguanamine-based spherical particles, crosslinked acrylic spherical particles, and silicone-based spherical particles.

Also, the content of the above-mentioned particles in the slipperiness-improving layer is 0.3 to 10% by weight, preferably 0.7 to 5% by weight. If the average particle size is less than 1 μm or if the particle content is less than 0.3% by weight, a satisfactory unevenness (fine protrusions) is less likely to be formed on the surface of the slipperiness-improving layer. Consequently, when the films are made as a sheet-fed film, an air layer is less likely to be created between the films, which prevents the reduction of friction after the release of the load, and makes it difficult to raise the printing speed. If the average particle size exceeds 10 μm, or if the particle content is more than 10% by weight, the film haze is increased to cause the deterioration of the transparency, and also the separation of the particles which results in the generation of a stain on the printing surface, a decrease in the printing quality, and contamination of the printer, and the like.

The polymeric wax components (d) that can be used in the present invention are not specifically limited, and include those known in the art, so long as they do not affect the transparency, for example, polyethylene-based waxes, polypropylene-based waxes, and fatty acid-based waxes, and the like. The weight-average molecular weight of the wax component is preferably 1,000 to 10,000, more preferably 1,500 to 6,000. If the molecular weight is less than 1,000, weeping from the inside of the coated layer onto the surface may cause transfer contamination of the printing surface, adversely affect the adhesiveness of the ink. If the molecular weight in more than 10,000, the improvement in the slipperiness will not be sufficient.

The content of the polymeric wax (d) in the slipperiness-improving layer is 1 to 10% by weight, preferably 2 to 8% by weight. If the content of the polymeric wax (d) in the slipperiness-improving layer is less than 1% by weight, the reduction of the friction coefficient is not sufficient, which results in the deterioration of the paper feeding property at high printing speed, making it impossible to print at high speed. If the content of the polymeric wax (d) in the slipperiness-improving layer exceeds 10% by weight, the separation of the wax component may cause contamination on the printing surface, and also deterioration of transparency with increased haze.

The slipperiness improving effect of the slipperiness-improving layer according to the present invention is accomplished by (1) the air retaining effect between the films due to the presence of unevenness on film surface (fine protrusions) of the particles which have an average particle size of 1 to 10 µm, and are contained in the modifying layer on both surfaces; (2) the anti-static electricity effect from the metal sulfonate contained in the slipperiness-improving layer; and (3) the reduction of the static friction coefficient from the polymeric wax component contained in the slipperiness-improving layer. If all of these three effects are not present, the resulting film has insufficient slipperiness when the severed film begins to move from the resting state, poor transferability from the sheeted and piled situation, poor engagement stability during the paper feeding, which makes it impossible to raise the printing speed.

According to the present invention, both the static and dynamic friction coefficients of the film surfaces of the adhesiveness-improving layer and the slipperiness-improving layer are preferably less than 0.5. If either of the friction coefficients exceeds 0.5, the resulting film has insufficient slipperiness which leads to the poor transferability of the film during the paper feeding in a sheet-fed printer.

BEST MODE CARRYING OUT THE INVENTION

EXAMPLES

The following examples specifically illustrate the present invention, but the present invention is not limited to these examples.

The characteristics shown in the examples are measured and evaluated according to the following procedures.

(1) The Evaluation of the Adhesiveness Between the Film and the Adhesiveness-improving Layer The adhesiveness between the syndiotactic polystyrene-based film and the adhesiveness-improving layer was evaluated by the following tape peeling test.

A 50 mm×60 mm portion of double-sided tape (No. 535A from Nitto Denzal, Corp.) was attached to a glass plate, to which an oriented syndiotactic polystyrene-based film having an adhesiveness-improving layer laminated was attached with the coating surface upward. Then, about half of a portion of cellophane adhesive tape (CT-24 from Nichiban, Corp.) having 24 mm width and 100 mm length was attached to the surface of the adhesiveness-improving layer. The attached portion of the cellophane adhesive tape was pressed and adhered to the layer with the folded curved portion of a polytetrafluoroethylene plate having 2 mm thickness, 30 mm width and 100 mm length. Then, the cellophane adhesive tape was rapidly peeled off by hand in a 90-degree direction, and the peeled place was visually observed. The quality of the adhesiveness between the adhesiveness-improving layer and the syndiotactic polystyrene-based film was determined as the case where the adhesive layer was not peeled off was designated as ◯, and the case where it was peeled off was designated as ×.

(2) The Evaluation of Printability

The printability (the wettability and adhesiveness of the ink) of the syndiotactic polystyrene-based film was evaluated according to the following evaluation procedure.

1) Gravure Ink

The adhesiveness-modifying side of an A-4 (210 mm×297 mm) test piece was coated with a gravure ink (New Fine R39 Navy Blue from Toyo Ink, Corp.) so that the thickness after drying was 3 µm, and dried at 90° C. for 120 seconds. In addition, the testing gravure ink was prepared by diluting a commercially available gravure ink with a diluent (NF102 from Toyo Ink, Corp.) and controlling its viscosity. The viscosity of the gravure ink was measured with a #3 Zahn Cup, and controlled so that it was 17 seconds. In the above evaluation, those which do not repel the ink was designated as ◯, and those which repel the ink was designated as ×. Further, the adhesiveness of the ink layer was evaluated by the same peeling test as in (1), and those which were not peeled off were designated as ◯, and those which were peeled off were designated as ×.

2) UV Curing Ink, Oxidation-type Polymeric Ink, Solvent-type Ink

A UV curing ink (UVA710 Black from Seiko Advance, Inc.) was printed on the adhesiveness-improving layer with a Tetron screen (#300 mesh), and exposed to UV at 500 mJ/cm$^2$.

An oxidation-type polymeric ink (from Jujo Kako, Corp., Black) was diluted with a diluent (Tetron (R) from Jujo Kako, Corp.) in the ratio of ink to diluent=4:1, and printed on the adhesiveness-improving layer with a Tetron screen (#250 mesh), and allowed to stand for 24 hours.

Using a solvent-type ink (TSP-400G from Toyo Ink, Corp.), the adhesiveness-improving layer of the film was printed with the RI Tester, and allowed to stand and dry for 24 hours, and evaluated according the above-described procedure. Also, using the other solvent-type ink (Tetron (R) from Jujo Ink, Corp.), the adhesiveness-improving layer of the film was printed with a #250 screen, and allowed to stand for 24 hours.

Then, each ink layer was cross-cut with a cutter knife to form 100 2 mm×2 mm grids, to which a cellophane adhesive tape (CT-24 from Nichiban, Corp.) was attached, avoiding air bubbles from entering therebetween, and further to which the folded curved portion of a polytetrafluoroethylene plate having 2 mm thickness, 30 mm width and 100 mm length having rubbed and tightly-adhered. Thereafter, both edges of the ink surface with no cellophane adhesive tape being adhered were pressed by hand, and rapidly peeled off in a 90-degree direction.

After the peeling, the ink surface was observed, and its adhesiveness was evaluated based on the percentage of the remaining ink on the 100 grids (Even a partially peeled grid was regarded as being peeled off) according to the following 4 ratings. The ratings ⊚ and ◯ were considered acceptable. In addition, the term, "sufficient adhesiveness" in the present invention is defined as having an ink remaining percentage of 90% or more in the above-described evaluation.

⊚: 100% remaining percentage (no peeling)

◯: 90 to less than 100% remaining percentage (practically used without any problems)

Δ: 70 to less than 90% remaining percentage (somewhat weak adhesiveness, and may cause some practical problems)

×: less than 70% remaining percentage (poor adhesiveness)

(3) Laminate Strength, Waterproof Laminate Strength

A 100:16 blend of a polyurethane-based adhesive (TM590 from Toyo Morton Corp.) and a curing agent (CAT56 from Toyo Morton Corp.) were coated on the adhesiveness-improving layer of the sample film, and thereafter dry-laminated with a linear low-density polyethylene film (L-LDPE film; L6102 from Toyobo, Co., Ltd.) at a thickness of 40 µm, and aged at 40° C. for three days to form a laminate film. The laminate film obtained according to the above-described procedure was made a 15 mm×150 mm cut sample in the lengthwise direction to expose the adhesive surface and measure the laminate strength (90-degree peeling). For the waterproof laminate strength, the adhesive surface of the film was exposed and the film was then immersed in water for 5 hours at room temperature, during which the laminate strength (90-degree peeling) was measured. The measurement of the peeling strength was made under the following conditions. The measurement device: the tensile tester (Tensilon UTMII typo from Toyo Baldwin, Corp.), the sample width: 15 mm, and the tensile speed: 200 mm/min.

(4) Glass Transition Temperatures of the Water-dispersible Copolymerized Polyesters First, a gauze was prepared by washing it with clean acetone and drying it. The adhesiveness-improving layer was scraped with gauze impregnated with acetone. A sample of the adhesiveness-improving layer, which was separated from the gauze, extracted with a Soxhlet extraction apparatus, and dried and solidified, was measured by DSC under the following conditions to determine the glass transition temperature according to the JIS K 7121.

(Soxhlet Extraction Conditions)

Solvent; acetone, hot water bath temperature; 95° C.

(DSC Measurement Conditions)

Apparatus; DSC3100 from MacScience, Corp., pan; aluminum pan (non-airtight type)

Sample weight; 4 mg, Starting temperature; −100° C.

Heating speed; 20° C./min. Atmosphere; argon (5) Proton NMR Measurements of the Water-dispersable Copolymerized Polyesters First, a gauze was prepared by thoroughly washing it with clean acetone at 95° C. in a hot water bath temperature using a Soxhlet extraction apparatus, followed by drying. The adhesiveness-improving layer was scraped with the gauze having a slight amount of acetone attached thereon. A 1 mg sample of the adhesiveness-improving layer, which was extracted from the gauze at 95° C. in a hot water bath temperature using a Soxhlet extraction apparatus, and dried and solidified by evaporating the acetone, was subjected to the proton NMR measurement under the following conditions.

(Measurement Conditions)

Apparatus: Nuclear magnetic resonance apparatus (AVANCE500 from BRUKER)

Solvent: deuterated chloroform/trifluoroacetic acid=9/1 (v/v)

$^1$H resonance frequency: 500 MHz. Number of integration: 512 Measurement temperature: room temperature (6) Surface Resistances The specific surface resistance value ($\Omega/\square$) for the adhesiveness-improving layer was measured by allowing a film sample to stand under an atmosphere of 23° C. and 65% RH for 24 hours, and using Hirestar IP (from Mitsubishi Yuka, Inc.) at an applied voltage of 500 V under this atmosphere.

(7) Contact Angle of Water

Using a CA-X type contact angle meter from Kyowa Kaimen Kagaku, Corp., the contact angle was measured for 30 seconds after adding about 0.05 cc of an ion exchanged water dropwise onto the adhesiveness-improving layer under the conditions of 25° C. and 60 RH %.

(8) Static Friction Coefficient µs, and Dynamic Friction Coefficient µd

These coefficients were measured under the following conditions according to JIS C 2151.

Test pieces for flat places; used on the slipperiness-improving layer at a width of 130 mm, and a length of 250 mm;

Test pieces for sleds: used on the adhesiveness-improving layer at a width of 120 mm, and a length of 120 mm;

Atmosphere: 23° C., 50% RH;

Sled weight: 200 g

Test speed: 150 mm/min.

(9) Water Resistance Values

On the adhesiveness-improving layer of the film, offset ink (Bestcure 161 from T & K Toka, Co., Ltd.) was printed with an RI tester (RI-3 from Min Seisakusho). Then, the laminated film was exposed to a high pressure mercury lamp at an irradiation energy of 200 mJ/cm$^2$, an irradiation distance of 15 cm while feeding it at 5 m/min. to form an ink layer of 1 µm thickness.

The resulting film was placed in water in an autoclave (SR-24 from Tomy Seiko, Corp.), and subjected to the pressure boiling treatment at 120° C. over 1 hour. After the boiling treatment, the autoclave was returned to ordinary pressure, and the laminated film was removed from the autoclave. After the water on the surface of the laminated film was removed, the film was allowed to stand at an ordinary temperature for 12 hours.

The adhesiveness of the ink layer of the laminated film after the boiling treatment was determined according to the testing procedure of JIS K 5400, 8.5.1. Specifically, 100 grid scratch marks were made up to the base film using a cutter knife at a gap of 2 mm. Then, a portion of cellophane adhesive tape (No. 405 from Nichiban, Corp., 24 mm width) was attached to the grid scratch surfaces. The attached portion of the cellophane adhesive tape was pressed and adhered to the layer with the folded curved portion of it polytetrafluoroethylene plate having 2 mm thickness, 30 mm width and 100 mm length. Then, the cellophane adhesive tape was vertically peeled off from the film, and the number of the peeled grids was visually counted to determined the adhesiveness according to the following equations. In addition, even a partially peeled grid was counted as being peeled off.

Adhesiveness (%)=(1−the number of the peeled grids/100)×100

The water resistance was rated based on the following standard

⊚: 100%, ◯: 99-96%, Δ: 95-80%, and ×: 79-0%

(10) Compatibility with Wetting with Water

When the adhesiveness-improving layer of the film was printed using a solvent-type offset printing ink (TSP-400G, from Toyo Ink, Corp.) by the RI tester, the printing surface before applying the ink was wetted by adding 0.2 ml, 0.4 ml or 0.6 ml of an ion exchanged water dropwise using a dropper, and pressed by a Morton roller, and then printed with the ink. The presence or absence of the ink transfer problem was observed.

(11) Paper Feeding Stability

Using a sheet-fed offset printer (Speed Master from Heidelberg, Corp., a eight-color printer), sheet-fed films having a full size of 636 mm×939 mm were laminated, and fed and printed at a low printing speed of 4,000 sheet/hr., and a high printing speed of 8,000 sheets/hr., and evaluated in paper feeding stability.

(12) Printing Quality

The appearance of the printed samples used in the paper feeding stability evaluation was visually observed. On this occasion, the appearance was visually observed not from the printed surface, but through the film from the back surface. The following criteria were used.

Clarity: The printed image is clearly visible without being interrupted by the base film or the coated layer.

Printability: Neither color shading nor lack of cohesion due to the poor transfer of the printing ink is found.

(13) Tensile Impact Strength

The film was cut at a size of 100 mm in the longitudinal direction and 10 mm in the transversal direction to form a sample for the measurement. The tensile impact strength of the sample was measured using a UNIVERSAL IMPACT TESTER from Toyo Seiki Seisakusho according to the following procedure. One side of the measurement sample was installed into a cross head, and the other was installed into a hammer. The arm was shaken down to the sample at an air shot full scale of 10 kgf and an uplifted angle of 135 degrees, and a location where the needle has stopped was read. The tensile impact strength (K) was calculated from the angle according to the following formula. Each sample was measured eight times, and the maximum and minimum values were eliminated. The remaining six measurement values were averaged, and used.

$$K=E\times 9.807\times 10^{-2}/(T\times W)$$

K; Tensile impact strength $(J/mm^2)$ $E=0.7071\times WR+WR \cos \beta$

T; Sample thickness (mm)

W; Sample width (mm)

E; Work load (kgf×cm)

WR; 5.8579 (kgf×cm)

β; Measurement angle (degree)

(Manufacture of Oriented Syndiotactic Polystyrate-based Films)

A Polymer chip made by adding 2.0% by weight of crosslinked polystyrene fine particles having an average particle size of 2 μm as a slipping agent to 100% by weight of a syndiotactic polystyrene (having a weight-average molecular weight of 300,000) was mixed with a polymer chip having no slipping agent added at a weight ratio of 1:9, and then dried, melted at 295° C., extruded from the T dies of a 500 μm lip gap, adhered, cooled and solidified by a 40° C. cooling roll according to the electrostatic application method to form a 40 μm amorphous non-oriented sheet.

Said amorphous non-oriented (unstretched) sheet was first pre-heated at 98° C. with the roll, and further heated at a surface temperature of 750° C. with four infrared heaters, oriented (stretched) 3.3-fold at a film temperature of 140° C. in the longitudinal direction, and further oriented (stretched) 1.2-fold with a 120° C. roll in the longitudinal direction, then subjected to the 12% longitudinal relaxation treatment between the 150° C. ceramic roll and the 40° C. metal roll, coated with the prescribed coating solution by a dies coating procedure, dried with a 70° C. hot air. and further pre-heated at 110° C. with a tenter, oriented (stretched) 3.5-fold at an orientation (stretching) temperature of 120° C. in the transversal direction, and thermally fixed at 265° C. for 10 seconds. Then, it was subjected to the 5% transversal relaxation treatment at 230° C., and further to the 3% longitudinal relaxation treatment between the 220° C. ceramic roll and the 40° C. metal rolls to form a biaxially oriented syndiotactic polystyrene-based film having a film thickness of 20 μm. The total amount of the coating agent applied was 0.1 $g/m^2$. The tables show the evaluation results of the resulting oriented syndiotactic polystyrene-based films.

Example 1A

As the coating solution for the formation of the adhesiveness-improving layer, a styrene-acrylic water-dispersible polymer solution (VBP101 from Sakata Ink, Corp., solid concentration: 35±5% by weight (from the brochure)) was diluted in pure water to 10 to 20% by weight, and used.

Comparative Example 1

An oriented syndiotactic polystyrene-based film having no adhesiveness-improving layer was obtained by the same procedure as in Example 1A except that no coating solution was applied.

Example 2A

As the coating solution for the formation of the adhesiveness-improving layer, a water dispersion of a random copolymer comprising styrene, methyl methacrylate, butyl methacrylate, and 2-hydroxyethyl methacrylate as major components was diluted in pure water to 10 to 20% by weight, and used. The weight ratio of the styrene in said polymer was 0.48.

Example 3A

As the coating solution for the formation of the adhesiveness-improving layer, a water dispersion of a polymer having an acrylic monomer graft-polymerized onto a polystyrene chain, said acrylic monomer comprising methyl methacrylate, butyl methacrylate, and 2-hydroxyethyl methacrylate as major components, was diluted in pure water to 10 to 20% by weight, and used. The weight ratio of the styrene in said polymer was 0.48.

Example 4A

As the coating solution for the formation of the adhesiveness-improving layer, a water dispersion of a block copolymer of a polystyrene chain and a chain comprising methyl methacrylate, butyl methacrylate, and 2-hydroxyethyl methacrylate as major components was diluted in pure water to 10 to 20% by weight, and used. The weight ratio of the styrene in said polymer was 0.48.

Examples 5A, 6A, 7A, 8A, 9A

As the coating solutions for the formation of the adhesiveness-improving layer, a water dispersion of a random copolymer comprising styrene, methyl methacrylate, butyl methacrylate, and 2-hydroxyethyl methacrylate as major components was used. The weight ratios of the styrene component in said polymers were 0.25, 0.45, 0.65, 0.90, and 0.10.

Examples 1B, 2B

Comparative Examples 2, 3

As the coating solution for the formation of the adhesiveness-improving layer, each of a water-dispersible type copolymerized polyester having a glass transition temperature of −7° C. (Bironal MD-1930 from Toyobo Co., Ltd.), a water-dispersible type copolymerized polyester having a glass transition temperature of −17° C. (Bironal MD-1985 from Toyobo Co., Ltd.), a water-dispersible type copolymerized polyester having a glass transition temperature of 70° C.

(Bironal MD-1200 from Toyobo Co., Ltd.), and a water-dispersible type copolymerized polyester having a glass transition temperature of 79° C. (Bironal MD-1500 from Toyobo Co., Ltd.) was diluted in a 9:1 (by weight) mixture of water/isopropyl alcohol to a solid concentration of 10% by weight, and used.

Examples 3B, 4B

Comparative Examples 4, 5

As the coating solution for the formation of the adhesiveness-improving layer, 300 parts by weight of a copolymerized polyester having the following molar ratio, and 140 parts by weight of n-butyl cellosolve were stirred in the vessel at 150-170° C. for about 3 hours to form a homogeneous solution, which was cooled to 80° C., and slowly added with 560 parts by weight of water while stirring to yield a milk white water dispersion having a solid concentration of 30% by weight. The water dispersion was further diluted with a 9:1 (by weight) mixture of water/isopropyl alcohol to a solid concentration of 10% by weight, and used.

Examples 2D, 3D

As the coating solution for the formation of the adhesiveness-improving layer, the water dispersion of the same polyamide-based resin as in Example 1D was used, except that each of the copolymerization compositions of the polyamide-based resins was N-bis(aminoethyl)methylamine/adipic acid/ε-caprolactam=25/25/50 (mole %), and N-bis(aminoethyl)ethylamine/a polystyrene glycol with a molecular weight of 600, having amino propyl groups introduced into both ends/hexamethylene diamine/adipic acid/sebacic acid=15/35/50/85/15.

Example 1E

As the coating solution for the formation of the adhesiveness-improving layer, 440 parts by weight of acrylonitrile, 50 parts by weight of methyl acrylate, 16 parts by weight of sodium p-styrene sulfonate, and 1181 parts by weight of water were charged into an autoclave, followed by the addition of 0.5 part by weight of di-tert-butyl peroxide as a polymerization initiator, on the basis of the sum of the monomer

TABLE 1

| copolymer composition (molar ratio) | dicarboxylic acid components | | | | diol components | | |
|---|---|---|---|---|---|---|---|
| | terephthalic acid | isophthalic acid | adipic acid | sulfo-inophthalic acid Na salt | ethylene glycol | diethylene glycol | neopentyl glycol |
| Example 3B | 55 | 0 | 44 | 2 | 50 | 50 | 0 |
| Example 4B | 50 | 0 | 44 | 6 | 60 | 0 | 40 |
| Comparative Example 3B | 47 | 47 | 0 | 6 | 60 | 0 | 40 |
| Comparative Example 4B | 48 | 31 | 15 | 6 | 60 | 0 | 40 |

Examples 1C, 2C

As the coating solution for the formation of the adhesiveness-improving layer, each coating solution (having a solid content of 9% by weight) of a water-soluble polyurethane resins having the terminal isocyanate groups blocked with hydrophilic groups (Estron from Dai-ichi Kogyo Seiyaku Co., Ltd.), and the water dispersion of a polyurethane resin (AP-30 from Dainippon Ink and Chemicals, Inc.) was used.

Example 1C

As the coating solution for the formation of the adhesiveness-improving layer, a water-soluble polyurethane resin having the isocyanate end groups blocked with hydrophilic groups (Estron from Dai-ichi Kogyo Seiyaku Co., Ltd.) was diluted to a solid content of 9% by weight, and used.

Example 1D

As the coating solution for the formation of the adhesiveness-improving layer, the water dispersion (having a solid concentration of 8% by weight) of a polyamide-based resin comprising ε-caprolactam/sebacic acid/a polyetylene glycol with a molecular weight of 600, having amino propyl groups introduced into both ends (56 mole %/22 mole %/22 mole %) was used.

amounts, and thereafter sealed, and then polymerized at a temperature of 130° C. for 23 minutes while stirring to yield a polyacrylonitrile-based resin emulsion. The emulsion was diluted with a 95:5(by weight) mixture of water/isopropanol to a resin concentration of 10% by weight, and used.

Example 2E

As the coating solution for the formation of the adhesiveness-improving layer, an emulsion obtained by the same procedure as in Example 1E, except that the polyacrylonitrile-based resin composition was changed to acrylonitrile/butyl methacrylate/acrylic acid/sodium p-styrene sulfonate=85/7/5/3 (weight ratio).

Example 1F

As the coating solution for the formation of the adhesiveness-improving layer, each coating solution (having a solid concentration of 10% by weight) of an ethylene-vinyl acetate-based water-dispersion, Sumika Flex S-401 from Sumika Chemtex, Corp., and an ethylene-vinyl acetate-based water-dispersion, Sumika Flex S-951 from Sumika Chemtex, Corp. (Special ester copolymer) was used.

Examples 1G, 2G

As the coating solution for the formation of the adhesiveness-improving layer, each coating solution (having a solid concentration of 10% by weight) of a modified ionomer-based polyolefinic resin water dispersion, Chemipearl S-120 from Mitsui Chemicals, Inc., a modified polyethylene-based polyolefinic resin water dispersion, Chemipearl M-200 from Mitsui Chemicals, Inc., and a modified polyetbylene-based polyolefinic resin water dispersion, Hitec S-3121 was used.

Example 1H

As the coating solution for the formation of the adhesiveness-improving layer, a coating solution (having a solid content of 10% by weight) consisting of an aqueous alkali solution of a copolymer resin comprising an isobutylene unit, a maleic acid unit, and a n-butyl acrylate unit, Kuraray Isoban-10 from Kuraray Co., Ltd.

Example 1H

As the coating solution for the formation of the adhesiveness-improving layer, a coating solution (having a solid content of 10% by weight) comprising Kuraray Isoban-10 from Kuraray Co., Ltd., and a water-dispersible polyester resin, MD-1200 from Toyobo, Co., Ltd., both of which were blended at an equivalent weight ratio, was used.

Example 10A

As the coating solution for the formation of the adhesiveness-improving layer, a coating solution of a water-dispersible copolymer comprising as major components styrene, methyl methacrylate, butyl methacrylate, and 2-hydroxyethyl methacrylate (the weight ratio of the styrene component to the copolymer is 0.25 to 1), and ammonium polystyrene sulfonate having a molecular weight of 70,000 (from Nihon NSC, Corp.), both of which were blended at a solid weight ratio of 70/30, and adjusted so that the total resin solid concentration was 5% by weight, and water/isopropyl alcohol=60/40, was used.

Examples 11A, 12A

As the coating solution for the formation of the adhesiveness-improving layer, a coating solution prepared in the same manner as in Example 10A was used, except that the weight ratio of the styrene component was changed to 0.45 and 0.65, respectively.

Example 13A

As the coating solution for the formation of the adhesiveness-improving layer, a coating solution prepared in the same manner as in Example 10A was used, except that the ammonium polystyrene sulfonate having a molecular weight of 70,000 was replaced with lithium polystyrene sulfonate having a molecular weight of 10,000 (from Nihon NSC, Corp.).

Comparative Example 6

As the coating solution for the formation of the adhesiveness-improving layer, a coating solution prepared in the same manner as in Example 10A was used, except that it comprises ammonium polystyrene sulfonate alone.

Example 14A

As the coating solution for the formation of the adhesiveness-improving layer, a coating solution prepared in the same manner as in Example 10A was used. As the coating solution for the formation of the slipperiness-improving layer, a coating solution (having all solid concentration of 5% by weight) made by blending in a mixed solvent of an ion exchanged water and isopropyl alcohol (weight ratio: 60/40) a water-dispersible polyester-based copolymer (Vylonal MD-16 from Toyobo, Co., Ltd.), dodecyldiphenyloxide sodium sulfonate as the metal sulfonate (An anionic anti-static agent from Matsumoto Yughi, Co., Ltd.), a polyethylene-based emulsion wax as the polymeric wax (from Toho Chemical Industries Co., Ltd.), styrene-benzoguanamine type spherical organic particles having an average particle size of 2.2 µm as the particles (from Nihon Shokubai Industries Co., Ltd.), and a colloidal silica having an average particle size of 0.04 µm as the particles (Nissan Chemical Industries, Ltd.) was used so that the solid weight ratio was 50/2.5/2.5/0.5/5.

Examples 15A, 16A

As the coating solution for the formation of the adhesiveness-improving layer, the same coating solution as in each of Examples 11A and 12A. As the coating solution for the formation of the slipperiness-improving layer, the same coating solution as in Example 14A was used for both examples.

Examples 17A

As the coating solution for the formation of the adhesiveness-improving layer, the same coating solution as in Example 10A was used. As the coating solution for the formation of the slipperiness-improving layer, a coating solution (having a solid concentration of 5% by weight) of a water-dispersible polyester-based copolymer (Vylonal MD-16 from Toyobo, Co., Ltd.)/dodecyldiphenyloxide sodium disulfonate/(An anionic anti-static agent from Matsumoto Yushi, Co., Ltd.)/a polyethylene-based emulsion wax (from Toho Chemical Industries Co., Ltd.)/styrene-benzoguanamine-based spherical organic particles (from Nihon Shokubai Industries Co., Ltd.)/a colloidal silica having an average particle size of 0.04 µm (Nissan Chemical Industries, Ltd.) at a solid weight ratio of 50/5/2.5/0.5/5 was used.

Comparative Example 1

As the coating solution for the formation of the slipperiness-improving layer, the same coating solution as in Example 14A was used, except that the polymeric wax blended in Example 14A was not used.

Comparative Example 2

Only the slipperiness-improving layer was formed.

Comparative Example 3=Example 10A

The formation of the slipperiness-improving layer was not performed in Example 14A.

Comparative Example 4=Comparative Example 1

Example 18A

An oriented syndiotactic polystyrene-based film was formed in the same manner as in Example 2A, except that a film material prepared by blending the thermoplastic elastomer 10 parts by weight of it styrene-butadiene-styrene block copolymer (SBS) having a styrene content of 40% by weight into 100 parts by weight of a syndiotactic polystyrene (having a weight-average molecular weight of 300,000) containing crosslinked-polystyrene particles having an average particle size of 2 µm as the slipping agent, and drying the blend.

Examples 19A, 20A, 21A

An oriented syndiotactic polystyrene-based film was formed in the same manner as in Example 18A, except that each of 10 parts by weight of a styrene-isoprene-styrene-block copolymer (SIS), 12 parts by weight of a hydrogenated styrene-butadiene-styrene block copolymer (SEBS), and 15 parts by weight of a hydrogenated styrene-isoprene-styrene block copolymer (SEPS) was blended as the thermoplastic elastomer, respectively.

TABLE 2

| | Adhesiveness-improving layer | Adhesiveness to the adhesiveness-improving layer | Gravure ink printability Anti-Repelling | Adhesive-ness | Waterproof laminate strength (gf/15 mm) | Ratio of the styrene-based monomers (weight ratio) |
|---|---|---|---|---|---|---|
| Example 1A | (A) | ○ | ○ | ○ | Not measured | unknown |
| Comparative Example 1A | None | X | ○ | X | 9 | — |
| Example 2A | (A) | ○ | ○ | ○ | 120 | 0.48 |
| Example 3A | (A) | ○ | ○ | ○ | 100 | 0.48 |
| Example 4A | (A) | ○ | ○ | ○ | 110 | 0.48 |
| Example 5A | (A) | ○ | ○ | ○ | 120 | 0.25 |
| Example 6A | (A) | ○ | ○ | ○ | 140 | 0.45 |
| Example 7A | (A) | ○ | ○ | ○ | 150 | 0.65 |
| Example 8A | (A) | ○ | ○ | X | 30 | 0.90 |
| Example 9A | (A) | X | ○ | X | 15 | 0.10 |

TABLE 3

| | Adhesiveness-improving layer | Tg (° C.) | Adhesiveness to the adhesivess-improving layer | Gravure ink printability Anti-Repelling | Adhesiveness | The names of the Vylonals used for the coating polution |
|---|---|---|---|---|---|---|
| Example 1B | (B) | −7 | ○ | ○ | ○ | MD-1930 |
| Example 2B | (B) | −17 | ○ | ○ | ○ | MD-1985 |
| Comparative Example 2 | polyester | 70 | X | ○ | ○ | MD-1200 |
| Comparative Example 3 | polyester | 79 | X | ○ | ○ | MD-1500 |

TABLE 4

| | Adhesiveness-improving layer | B/(A + B) value(−) | Adhesiveness to the adhesiveness-improving layer | Gravure ink printability Anti-Repelling | Adhesiveness |
|---|---|---|---|---|---|
| Exanple 3B | (B) | 0.16 | ○ | ○ | ○ |
| Example 4B | (B) | 0.17 | ○ | ○ | ○ |
| Comparative Example 4 | polyester | 0.38 | X | ○ | X |
| Comparative Example 5 | polyester | 0.29 | X | ○ | X |

TABLE 5

| | Adhesiveness-improving layer | Adhesiveness to the adhesiveness-improving layer | Gravure ink printability Anti-Repelling | Adhesiveness | Waterproof laminate strength (gf/15 mm) |
|---|---|---|---|---|---|
| Example 1C | (C) | ○ | ○ | ○ | 90 |
| Example 2C | (C) | ○ | ○ | ○ | 100 |
| Example 1D | (D) | ○ | ○ | ○ | 100 |
| Example 2D | (D) | ○ | ○ | ○ | 90 |
| Example 3D | (D) | ○ | ○ | ○ | 110 |
| Example 1E | (E) | ○ | ○ | ○ | 120 |
| Example 2E | (E) | ○ | ○ | ○ | 130 |
| Example 1F | (F) | ○ | ○ | ○ | 120 |

TABLE 5-continued

|  | Adhesiveness-improving layer | Adhesiveness to the adhesiveness-improving layer | Gravure ink printability Anti-Repelling | Adhesiveness | Waterproof laminate strength (gf/15 mm) |
|---|---|---|---|---|---|
| Example 2F | (F) | ○ | ○ | ○ | 138 |
| Example 1G | (G) | ○ | ○ | ○ | 105 |
| Example 2G | (G) | ○ | ○ | ○ | 95 |
| Example 3G | (G) | ○ | ○ | ○ | 120 |
| Example 1H | (H) | ○ | ○ | ○ | 110 |
| Example 2H | (H) * polyester | ○ | ○ | ○ | 140 |

TABLE 6

|  | Surface resistance value (Ω/□) | UV-curing type ink adhesiveness | Oxidation polymeric ink adhesiveness | Laminate strength (gf/15 mm) |
|---|---|---|---|---|
| Example 10A | $5 \times 10^{11}$ | ◎ | ◎ | 110 |
| Example 11A | $5 \times 10^{11}$ | ◎ | ◎ | 130 |
| Example 12A | $5 \times 10^{11}$ | ◎ | ◎ | 135 |
| Example 13A | $8 \times 10^{11}$ | ◎ | ◎ | 135 |
| Comparative Example 6 | $8 \times 10^{11}$ | X | X | 9 |
| Comparative Example 1 | $>1 \times 10^{11}$ | X | X | 9 |
| Example 5A | $>1 \times 10^{11}$ | ◎ | ◎ | 120 |

TABLE 7

|  |  | Example 14A | Example 15A | Example 16A | Example 17A | Comparative Example 7 | Comparative Example 8 | Example 10A | Comparative Example 1 |
|---|---|---|---|---|---|---|---|---|---|
| Slipperiness | μm(-) | 0.32 | 0.31 | 0.31 | 0.31 | 0.45 | 0.50 | 0.50 | 0.61 |
|  | μd(-) | 0.45 | 0.45 | 0.45 | 0.45 | 0.50 | 0.52 | 0.52 | 0.66 |
| Surface resistance (Ω/□) Slipperiness-improving layer |  | $2 \times 10^{11}$ | $2 \times 10^{11}$ | $2 \times 10^{11}$ | $2 \times 10^{11}$ | $2 \times 10^{11}$ | $2 \times 10^{11}$ | $2 \times 10^{11}$ | $>1 \times 10^{11}$ |
| UV ink adhesiveness | Offset ink | ○ | ○ | ○ | ○ | ○ | ○ | ○ | X |
|  | Screen ink | ○ | ○ | ○ | ○ | ○ | ○ | ○ | X |
| Solvent-type ink adhesiveness | Offset ink | ○ | ○ | ○ | ○ | ○ | ○ | ○ | X |
|  | Screen ink | ○ | ○ | ○ | ○ | ○ | ○ | ○ | X |
| Water resistance |  | ◎ | ◎ | ◎ | ○ | ◎ | X | ◎ | X |
| Compatibility with wetting with water |  | ○ | ○ | ○ | ○ | ○ | X | ○ | X |
| Printing quality |  | ○ | ○ | ○ | ○ | ○ | X | ○ | X |
| Paper feeding stability | High printing speed | ○ Stable | ○ Stable | ○ Stable | ○ Stable | X Stopped | X Stopped | X Stopped | X Stopped |
|  | Low printing speed | ○ Stable | ○ Stable | ○ Stable | ○ Stable | X Stopped | X Stopped | X Stopped | X Stopped |

TABLE 8

|  | Thermoplastic elastomer Type | Amount (parts of weight) | With or without a coated layer | Tensile impact strength (1/mm³) | Laminate strength (gf/15 mm) | Waterproof laminate strength (gf/15 mm) |
|---|---|---|---|---|---|---|
| Example 18A | 689 | 10 | With | 1.2 | 180 | 120 |
| Example 19A | 938 | 10 | With | 1.3 | 180 | 130 |
| Example 20A | SEB5 | 12 | With | 1.5 | 190 | 120 |
| Example 21A | SEP5 | 15 | With | 1.6 | 190 | 125 |
| Comparative Example 1 | — | 0 | Without | 0.4 | 9 | 12 |

INDUSTRIAL APPLICABILITY

As described above, the present invention provides an oriented syndiotactic polystyrene-based film having excellent adhesiveness between the film and the adhesiveness-improving layer, and excellent adhesiveness to the ink layer and the laminate layer, if any, by using such a structure as defined in the claims. Also, it is economical, because it allows to laminate the adhesiveness-improving layer by the inline coating technique in the film manufacturing process. Moreover, the resulting film may be recycled.

Also, the present invention may provide a laminated oriented syndiotactic polystyrene-based film having excellent compatibility with wetting with water and anti-static property, as well as slipperiness which allows for a stable feeding with no multiple-feeding problem at a high speed paper feeding.

Therefore, the present film is suitably used as a package film (especially, a easy-to-tear package bag) and a printed film (especially, film for offset printing).

What is claimed is:

1. An oriented syndiotactic polystyrene-based film, comprising a film consisting of a styrene-based polymer having a syndiotactic structure, and a laminated adhesiveness-improving layer on at least one side of said film, wherein said layer comprises one or more of the following resins (A)-(H):
   (A) a water-dispersible polymer made by copolymerizing a monomer having an aromatic ring on its side chain with an acrylic monomer;
   (B) a water-dispersible copolymerized polyester having a glass transition temperature of 30° C. or less, and/or a water-dispersible copolymerized polyester satisfying the following (1):
   (1) a ratio of B/(A+B) is 0.07 to 0.25, wherein A and B are the integrated values at chemical shifts of 1.0 ppm to 6.0 ppm and 7.0 ppm to 9.0 ppm, respectively, in $^1$H NMR;
   (C) a water-soluble and/or a water-dispersible polyurethane resin;
   (D) a water-soluble and/or a water-dispersible polyamide resin;
   (E) a water-dispersible polyacrylonitrile resin;
   (F) a water-dispersible ethylene-vinyl ester copolymer resin;
   (G) a water-dispersible modified polyolefinic resin; and
   (H) a copolymer resin having an isobutylene unit, a maleic acid unit, and a n-butyl acrylate unit;
   wherein said adhesiveness-improving layer comprises a polymer comprising a polystyrene sulfonate salt as a major component.

2. The oriented syndiotactic polystyrene-based film of claim 1, wherein said coated layer has a surface resistance value at 25° C. and 60 Rh % of $1\times10^{12}$ Ω/□ or less.

3. The oriented syndiotactic polystyrene-based film of claim 1, wherein said adhesiveness-improving layer is formed on an unstretched film or a uniaxially oriented film consisting of a styrene-based polymer having a syndiotactic structure, and then stretching said film once or more in the uniaxial or biaxial direction, and thereafter subjecting said film to heat treatment.

4. An oriented syndiotactic polystyrene-based film, comprising a film consisting of a styrene-based polymer having a syndiotactic structure, and a laminated adhesiveness-improving layer on at least one side of said film, wherein said layer comprises one or more of the following resins (A)-(H):
   (A) a water-dispersible polymer made by copolymerizing a monomer having an aromatic ring on its side chain with an acrylic monomer;
   (B) a water-dispersible copolymerized polyester having a glass transition temperature of 30° C. or less, and/or a water-dispersible copolymerized polyester satisfying the following (1):
   (1) a ratio of B/(A+B) is 0.07 to 0.25, wherein A and B are the integrated values at chemical shifts of 1.0 ppm to 6.0 ppm and 7.0 ppm to 9.0 ppm, respectively, in $^1$H NMR;
   (C) a water-soluble and/or a water-dispersible polyurethane resin;
   (D) a water-soluble and/or a water-dispersible polyamide resin;
   (E) a water-dispersible polyacrylonitrile resin;
   (F) a water-dispersible ethylene-vinyl ester copolymer resin;
   (G) a water-dispersible modified polyolefinic resin; and
   (H) a copolymer resin having an isobutylene unit, a maleic acid unit, and a n-butyl acrylate unit;
   wherein a slipperiness-improving layer is formed on a side of said adhesiveness-improving layer opposite to the side in contact with the at least one side of said film, wherein said slipperiness-improving layer consists of a composition comprising (a) a copolymerized polyester resin, (b) a compound having a sulfonate group, (c) particles having an average particle size of 1.0 to 5.0 μm, and (d) a polymeric wax.

5. The oriented syndiotactic polystyrene-based film of claim 4, wherein said adhesiveness-improving layer and/or slipperiness-improving layer is formed on an unstretched film or a uniaxially oriented film consisting of a styrene-based polymer having a syndiotactic structure, and then stretching said film once or more in the uniaxial or biaxial direction, and thereafter subjecting said film to heat treatment.

6. The oriented syndiotactic polystyrene-based film of any one of claims 1 and 4, wherein (A) said water-dispersible polymer made by copolymerizing a monomer having an aromatic ring on its side chain with an acrylic monomer consists of a water-dispersible copolymer comprising a styrene monomer component and an acrylic monomer component as a major component, and the weight ratio of said styrene monomer component in said polymer is 0.15 to 0.85.

7. The oriented syndiotactic polystyrene-based film of any one of claims 1 and 4 having a laminate strength of 50 gf/15 mm or higher.

8. The oriented syndiotactic polystyrene-based film of any one of claims 1 and 4 having a waterproof laminate strength of 50 gf/15 mm or higher.

9. The oriented syndiotactic polystyrene-based film of any one of claims 1 and 4, wherein said oriented syndiotactic polystyrene-based film comprises 3 to 30 parts by weight of at least one thermoplastic elastomer selected from a styrene-butadiene-styrene block copolymer (SBS), a styrene-isoprene-styrene block copolymer (SIS), and/or a hydrogenated compound thereof (SEBS and SEPS) on the basis of 100 parts by weight of the syndiotactic polystyrene-based polymer.

10. The oriented syndiotactic polystyrene-based film of claim 9, having a tensile impact strength of 0.65 j/mm$^2$ or higher, and a laminate strength of 50 gf/15 mm or higher.

* * * * *